Nov. 17, 1931.  J. J. GILBERT  1,832,455
SUBMARINE SIGNALING CONDUCTOR
Filed June 6, 1928
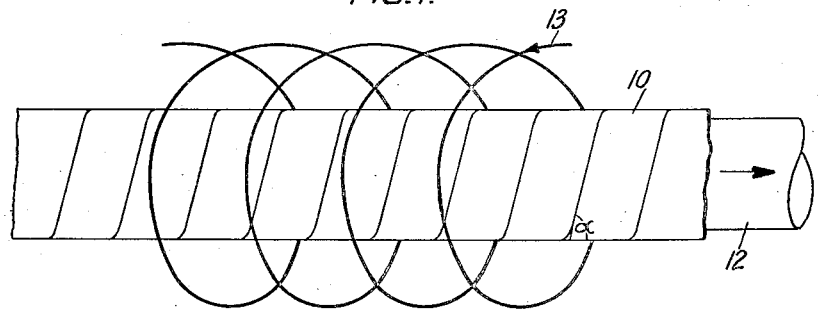
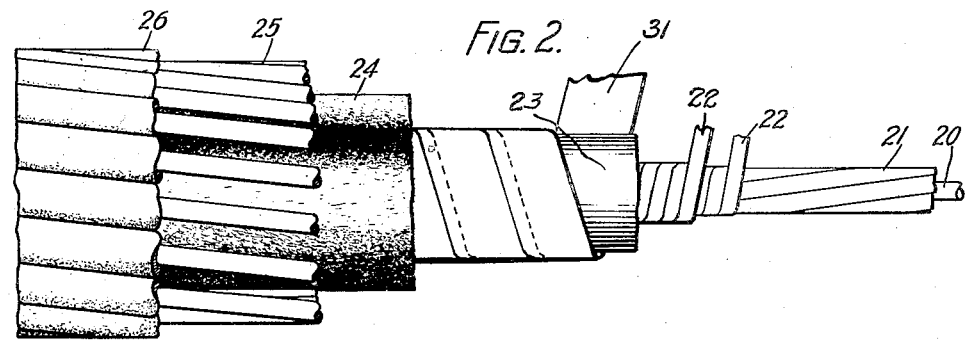
INVENTOR:
JOHN J. GILBERT
BY
J. W. Schmied
ATTORNEY Patented Nov. 17, 1931

1,832,455

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

SUBMARINE SIGNALING CONDUCTOR

Application filed June 6, 1928. Serial No. 283,373.

The present invention relates to improvements in continuously loaded signaling conductors.

A general object of the invention is to reduce energy losses in submarine cables.

A further object is to reduce the resistance of the return path of continuously loaded signaling cables.

Another object is to control the phase of currents in helical conductors in the return circuit of submarine signaling cables.

Another object of the invention is to provide a continuously loaded signaling cable in which the inductance per unit length of the return conductors may be controlled by giving to the lay of the loading tape, return conductor and armor wires, such angles and directions that the currents in the various return conductors are as nearly as possible in phase with each other.

A feature of the invention is a continuously loaded signaling cable in which the magnitude of the longitudinal axial component of flux is increased.

In a continuously loaded cable in addition to the magnetic flux encircling the conductor and contributing to its inductance there is present a component of flux parallel to the axis of the conductor, due to the fact that the magnetic flux follows the convolutions of the loading material which is ordinarily applied in the form of tape or wire. On account of the presence of this longitudinal component of flux, electromotive forces are induced in the parts of the cable external to the core, which give rise to energy losses contributing to the electrical resistance of the circuit.

Methods of reducing this effect in the so-called teredo tape employed for protecting the gutta percha insulation on shallow water portions of the cable have heretofore been proposed by applicant. These methods consist in choosing for the teredo tape a material having high resistivity, insulating the adjacent turns of the tape, and increasing the pitch of the tape.

Applicant has found, however, that in some cases it may be desirable not to reduce the effect of the longitudinal component of flux and that in fact it may be desirable for certain reasons in certain cases to accentuate the effect of the longitudinal component of flux. This is due to the fact that the longitudinal component of flux may increase or decrease the inductance of conductors in the return circuit, which conductors are normally wound helically around the core.

The above mentioned objects of the present invention may be attained in a specific preferred embodiment by winding the most important return conductor in a direction opposite to that of the loading tape. If a teredo tape is employed both the teredo tape and the most important return conductor may preferably be wound in one and the same direction but opposite to the direction of the loading tape. In this manner the phase of the currents in the several conductors of the return path is more nearly equal to the phase of currents in other conductors than would be the case if the longitudinal component of flux were not present.

In accordance with the invention the longitudinal component of flux due to current in the central conductor may be increased by increasing either the permeability, the thickness, or the angle of lay of the tape or wire of loading material, or all of these. The longitudinal component of flux may also be controlled by changing the direction of the turns and the number of turns per unit length of the return conductors. A proper selection of the number and direction of the turns increases the reactive component of the impedance of the armor wires and has a tendency of bringing the currents of the armor wires and sea water into phase with each other.

One method of practicing the present invention will now be described in connection with the accompanying drawings, in which:

Fig. 1 is a schematic view on an enlarged scale of a portion of a continuously loaded conductor surrounded by a helical concentric return conductor; and Fig. 2 is a view in elevation of a complete cable in accordance with the invention showing the elements of it as they would appear in successive stages of manufacture.

In Fig. 1, a conductor 12 is continuously loaded with loading material 10, applied in the form of tape having an angle of lay $\alpha$ as shown. If we assume the currents in the central conductor 12 and in the helical return conductor 13 to have the directions indicated, then the equations of the circuit comprising the central conductor, the return conductor 13 and another return conductor 14 which is not shown and which is not helical in character (such as the sea water, for instance) are as follows:

$$e = Z_1 i_1 + Z_2 i_2 - jp\Phi_1 n_2$$
$$e = Z_1 i_1 + Z_3 i_3 \quad (1)$$
$$i_1 = i_2 + i_3$$

where $e$ is the impressed electromotive force, $Z_1$, $Z_2$ and $Z_3$ are the impedances of the central conductor and of the two return conductors 13 and 14, respectively, $i_1$, $i_2$, $i_3$ are the corresponding currents, $n_2$ is the number of turns per centimeter by the return conductor 13 and $\Phi_1$ is the longitudinal component of flux due to current in the central conductor, $j$ is the imaginary operator and $p$ is the quantity $2\pi f$, where $f$ is the frequency of the flux $\Phi_1$.

The latter quantity may also be expressed by the equation:

$$\Phi_1 = 2\pi \mu i_1 t \sin 2\alpha = A i_1, \quad (2)$$

$\mu$, $t$ and $\alpha$ being respectively the permeability, thickness and angle of lay of the loading material and $A$ being the quantity $2\pi \mu t \sin 2\alpha$. In solving these equations for $$\frac{e}{i_1}$$

which is the effective impedance of the circuit we obtain:

$$\frac{e}{i_1} = Z_1 = \frac{Z_2 Z_3}{Z_2 + Z_3} + \Delta Z, \quad (3)$$

where $$\Delta Z = -jpn_2 A \frac{Z_3}{Z_2 + Z_3}. \quad (4)$$

$\Delta Z$ is the impedance increment due to the presence of the longitudinal component of flux. The first two terms of equation (3) represent the impedance of the circuit when the longitudinal flux is absent, the second term being the impedance of conductors 13 and 14 in parallel. The resistance increment will be positive or negative depending upon the relative magnitude of the real and imaginary components of $Z_2$ and $Z_3$ and upon the sign of $n_2$. The sign of $n_2$ is to be taken positive when the directions of lay of the loading material and of the helical return conductor are the same.

By way of a specific example of the improvements which may be achieved by the methods of the present invention, we may mention the case corresponding closely to that of a submarine telegraph cable. Assuming that the impedance of the armor wires $Z_2 = 5$, and that the impedance of the sea water $Z_3 = j$, we obtain $pn_2 A = 0.16$ and a resistance increment of 0.031 ohms per nautical mile.

This corresponds to the case where the directions of lay of the loading material and of the armor wire are the same ($n_2$ positive). However, if the direction of lay of the armor wires is opposite to that of the loading material ($n_2$ negative), the resistance increment will be $-0.031$, a reduction in the return resistance of about 10%.

It follows from equation (1), that taking $n_2$ negative (giving the lay of the armor wires a direction opposite to that of the loading material) is equivalent to increasing the reactive component of the impedance of the armor wires, which has a tendency of bringing the currents in the armor wire and sea water into phase. If there are two layers of loading tapes or wires which are not balanced as regards the longitudinal component of magnetic flux even though they are wound in opposite directions, then the return conductor should be wound in a direction opposite to that of the layer to which the excess longitudinal flux is due.

It follows from equation (2) that the magnitude of $A$ can be controlled by means of changing the permeability or the thickness or the angle of lay of the loading tape or wire, since variations in these quantities affect the resistance of the central conductor.

Fig. 2 illustrates one embodiment of the present invention. The central conductor 20 is surrounded by tapes 21 shaped to closely fit the central wire. Upon this composite conductor is served the loading material, having here the form of tape 22. Insulation 23 surrounds the loaded conductor and jute 24 protects the insulation. Further protection is provided by the armor wires 25 which are also surrounded by jute 26. The armor wires 25 serve the purpose of return conductors. In accordance with the invention the loading tapes 22 are given a lay in a direction opposite to that of the armor wires, as shown.

Although the invention has been described in connection with one specific embodiment, it is understood that the invention is not limited thereto, but it may take various forms or embodiments. For instance, if a teredo tape 31 were used in the embodiment of Fig. 2, in accordance with the invention both the teredo tape and the armor wires would be laid in the same direction, but opposite to the direction of the loading tapes. In every case it is the most important return conductor (the concentric return conductor for instance where such is used) which should be wound in a direction opposite to that of the loading tapes.

The term "tape" used in this specification and in the appended claims is intended to include equivalents, such as strips or wire.

What is claimed is:

1. In a submarine cable, a central conductor having spirally applied loading material, insulation upon the conductor and a spirally applied metallic structure outside of the insulation functioning as a return conductor in parallel with the sea water, means for reducing the return circuit resistance, said means consisting in that said metallic structure is laid in a direction opposite to the lay of the loading material and that the permeability, thickness and angle of lay of the loading material and angle of lay of the metallic structure are such that the resistance increment due to the interaction of the longitudinal component of flux and the metallic structure is a negative quality greater than two per cent of the total return circuit resistance.

2. A submarine signaling cable comprising a central conductor continuously loaded with a plurality of layers of magnetic material which are not balanced with respect to the longitudinal component of magnetic flux, said cable having the usual armor wires or other spirally wound return conductors and being characterized in this that the return conductor has a direction of application opposite to that of the loading tape to which the excess longitudinal flux is due.

3. A submarine signaling cable comprising a central conductor continuously loaded with tapes of magnetic material, insulation surrounding said conductor, a teredo tape surrounding said insulation, a return conductor external to said teredo tape, the teredo tape having a direction of lay opposite to that of the loading tapes.

4. A submarine signaling cable comprising a conductor continuously loaded with tapes of magnetic material, insulation surrounding said conductor, a teredo tape surrounding the tape, armor wires external to the teredo tape, characterized in this that the teredo tape and armor wires have a direction of lay opposite to the direction of lay of the loading tapes.

5. A submarine signaling cable comprising a conductor continuously loaded with tapes of magnetic material, insulation surrounding said conductor, a teredo tape and a return circuit surrounding said insulation, characterized in this that the return circuit and the teredo tape have directions of lay opposite to that of the loading material.

In witness whereof, I hereunto subscribe my name this 4th day of June, 1928.

JOHN J. GILBERT.